Nov. 25, 1924.   1,516,507
F. J. SENG
BUTT CUTTER
Filed March 7, 1924   2 Sheets-Sheet 1

Inventor
F. J. Seng
By D. Swift
Attorney

Nov. 25, 1924.  
F. J. SENG  
BUTT CUTTER  
Filed March 7, 1924
1,516,507
2 Sheets-Sheet 2
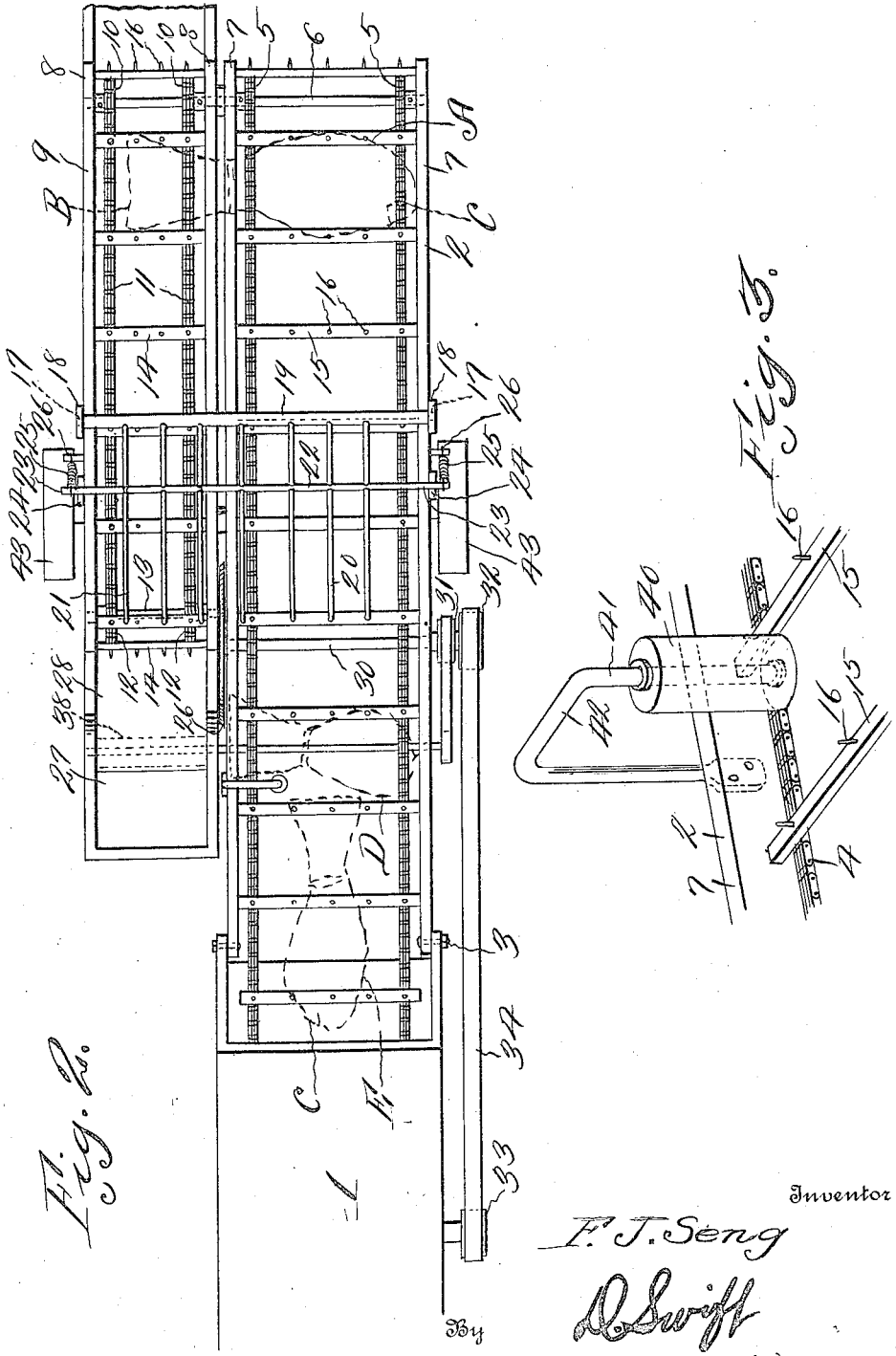

Patented Nov. 25, 1924.

1,516,507

UNITED STATES PATENT OFFICE.

FREDERICK J. SENG, OF DE WITT, ARKANSAS.

BUTT CUTTER.

Application filed March 7, 1924. Serial No. 697,519.

*To all whom it may concern:*

Be it known that I, FREDERICK J. SENG, a citizen of the United States, residing at De Witt, in the county of Arkansas, State of Arkansas, have invented a new and useful Butt Cutter; and I do hereby declare the following to be a full, clear, and exact description of the invention, such as will enable others skilled in the art to which it appertains to make and use the same.

The invention relates to butt cutters used in connection with separators of threshing machines and has for its object to provide a device of this character wherein as the sheaves of cereals, particularly rice are fed into the separator, their wet and muddy ends, which have become wet and muddy incident to standing in the field are severed, the butts or severed ends deposited in a conveyor which conveys the same away from the threshing machine, the sheaves moved forwardly in the direction of the separator, and engaged by a member which engages the sheaves adjacent their severed ends, causing said sheaves to be turned around on the feeding conveyor until they assume a position where they will enter the separator, head first.

A further object is to provide a butt cutter used as an extension to a threshing machine separator, said butt cutter comprising a main conveyor for feeding sheaves into the separator and an auxiliary conveyor adjacent one side of the main conveyor, said conveyors when a sheave is laid transversely thereon feeds the sheave forwardly into contact with a rotating severing element which severs the butt at the same time spring actuated compressing fingers are forcing downwardly on both ends of the sheave. Also to provide means for conveying the severed butt to a point remote from the cutter and to provide means between the cutter and the threshing machine separator for sluing the sheave so that it will enter the separator head first.

A further object is to provide means whereby all of the conveyors and the severing element may be operated from the separator mechanism, preferably from the beater mechanism.

With the above and other objects in view the invention resides in the combination and arrangement of parts as hereinafter set forth, shown in the drawings, described and claimed; it being understood that changes in the precise embodiment of the invention may be made within the scope of what is claimed without departing from the spirit of the invention.

In the drawings:—

Figure 2 is a top plan view of the butt cutter.

Figure 3 is a perspective view of the main conveyor adjacent the sluing device and showing the sluing device applied thereto.

Figure 1:
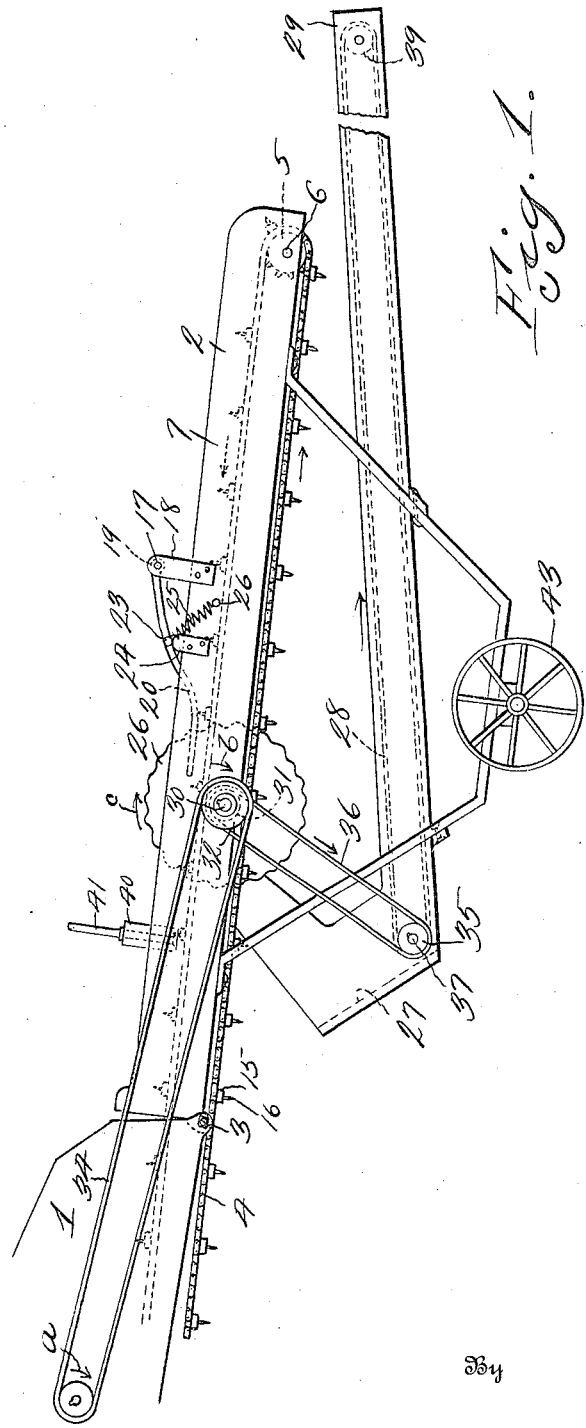
Figure 1 is a side elevation of the butt cutter showing the same applied to the separator of a threshing machine.

Referring to the drawings, the numeral 1 designates the separator of a conventional form of threshing machine and 2 the main conveyor, which conveyor is pivotally connected as at 3 to the separator. The feeder conveyor 4 extends rearwardly and passes over sprockets 5 carried by a shaft 6, which shaft has bearings in the side members 7 of the main conveyor 2, and bearings in the side members 8 of the auxiliary conveyor 9. The portion of the shaft 6 which is disposed in the auxiliary conveyor 9 is provided with sprockets 10, around which sprockets, endless chain 11 pass, which chains also pass around sprockets 12 carried by a shaft 13, the ends of which shaft are mounted in bearings of the sides 8 of the auxiliary conveyor. The auxiliary conveyor chains are connected together by transversely disposed strips 14, while the main conveyor chains are connected together by transversely disposed strips 15. Both strips 14 and 15 are provided with prongs 16 which grasp and hold the sheaves in transveres position as shown at A in Figure 2, so that as the main conveyor which is operated from the feeding mechanism and the auxiliary conveyor which is operated from the conveyor 4 will cause the sheave to move forwardly and be maintained in its transverse position. It will be noted that the butt end B of the sheave rests on the auxiliary conveyor 9 while the head end C thereof rests on the main conveyor and the sheave as a whole extending across the adjacent sides 7 and 8 of the main and auxiliary conveyor. Pivotally mounted in bearings 17 of brackets 18 carried by the outer sides of the main and auxiliary conveyors is a transversely disposed rockable shaft 19, which shaft has forwardly extending compression fingers 20 and 21. Fingers 20 being disposed over the main conveyor while the fingers 21 are disposed over the auxiliary conveyor. The fingers 20 and 21 are connected together and braced by a transversely disposed bar 22, the ends 23 of which extend beyond the outer sides of the conveyors and are so positioned that when the rockable shaft 19 rotates downwardly in its bearings, the ends 23 will engage the stops 24 carried by the outer sides of the conveyors, thereby limiting the downward movement of the compression fingers 20 and 21 under the influence of the coiled springs 25, which springs are connected to the ends 23 and the sides of the conveyor as at 26. As the sheave moves forwardly in transverse position on the main and auxiliary conveyors, it will be seen that the sheave will pass under the compression fingers 20 and 21 so that the sheave will be compressed by the fingers as it moves forwardly. While the sheave is in compressed condition and is moving forwardly under the fingers 20 and 21, it comes into engagement with the rotatable cutting element 26, which severs the butt B from the sheave and allows said butt to be conveyed forwardly by the auxiliary conveyor until it drops downwardly into the hopper 27, which is disposed below the auxiliary conveyor. Extending rearwardly from the hopper 27 is an endless conveyor 28 which delivers the severed butt rearwardly from the machine and if desired deposits the same in a wagon, which may be disposed beneath the rear end 29 of the conveyor 28.

The cutting element 26 is disposed between the adjacent sides of the main and auxiliary conveyors which sides form shearing bars cooperating with the cutting element. Cutting element 26 is preferably a serrated edge disc and is carried by the transversely disposed shaft 30 which is rotatably mounted in bearings of the sides 7 of the main conveyor, said shaft having secured on one end thereof pulleys 31 and 32. The pulley 32 is belted to the pulley 33 of the separator driving mechanism by means of a belt 34. It will be seen that as the pulley 33 rotates in the direction of the arrow $a$, the belt 34 will cause the pulley 32 to rotate in the direction of the arrow $b$, thereby causing the cutting element 26 to rotate in the direction of the arrow $c$, so that it will properly cooperate with the adjacent sides 7 and 8 of the main and auxiliary conveyors for properly shearing the butts from the sheaves. The pulley 31 is belted to a pulley 35 by means of the belt 36, said pulley 35 being carried by a transversely disposed shaft 37 which rotates in bearings of the hopper 27 and has thereon a roller 38 around which roller and the roller 39 the endless conveyor 28 passes. It will be seen that power from the separator operates the discharge conveyor 28 and the cutting element 26 through the single belt 34. It will also be seen that the auxiliary conveyor is operated by the main feed conveyor 4.

After the butts have been severed from the sheaves the sheaves move forwardly from under the compressing finger 21 until it assumes the position shown at D, in Figure 2, at which time the butt end of the sheave engages the roller 40 which is vertically disposed and pivotally mounted on the downwardly extending portion 41 of the arched bracket 42. As the main conveyor, which is the feed conveyor moves forwardly, it will be seen that the roller 40 will hold back on the butt end of the sheave, at the same time that its forward end is moving forwardly, thereby causing the sheaves to be slued around to the position shown in dotted lines at E in Figure 2, so that its head C will enter the separator 1 first.

The butt severing device is supported on wheels 43 so that said device when it is detached from the threshing machine may be moved from place to place as desired.

From the above it will be seen that a butt severing mechanism is provided which not only severs the butts but also combines the butt severing operation with the feeding operation whereby the butts are severed as the sheaves are fed into the separator of a threshing machine, thereby obviating the loss of time incident to severing the butts on a separate machine. It will also be seen that means is provided for conveying the severed butts away from the machine, thereby obviating the accumulation of butts around the severing device which interferes with operators feeding the sheaves into the separator.

The butt severer is particularly adapted for severing butts from sheaves of rice which have stood in the field, or which are wet and muddy, however, it is to be understood that the device is applicable for use in connection with other cereals.

The invention having been set forth what is claimed as new and useful is:—

1. The combination with a separator of a threshing machine, of a sheave feeding and butt severing mechanism therefor, said mechanism comprising a main feed conveyor connected to the saparator, an auxiliary conveyor disposed to one side of the main conveyor, compression fingers carried by a rockable member, said compression fingers being disposed over the main and auxiliary conveyors, a rotatable severing element disposed between the conveyors and adjacent the forward end of the auxiliary conveyor, a conveyor disposed below the auxiliary conveyor and extending rearwardly, and means disposed between the severing element and the separator whereby the sheaves after having their butts severed will be slued longitudinally before they enter the separator.

2. The combination with a separator of a threshing machine, of a sheave feeding and butt severing mechanism therefor, said mechanism comprising a main feed conveyor connected to the separator and an auxiliary conveyor disposed to one side of the main conveyor, spring actuated compression and holding fingers disposed over the main and auxiliary conveyors, a severing element disposed between the conveyors and adjacent the forward end of the auxiliary conveyor, a discharged conveyor disposed below the auxiliary conveyor and onto which discharge conveyor the severed butts are deposited, said auxiliary conveyor being operated by the main conveyor and means operated from the separator mechanism for operating the severing element and the discharge conveyor.

3. The combination with a separator of a threshing machine, of a feeding and butt severing mechanism, said feeding and butt severing mechanism comprising means whereby sheaves are moved forwardly in transverse position compressed and severed, then slued so that the sheaves will enter the separator head first.

4. The combination with a separator of a threshing machine, of a butt severing and feeding mechanism, said butt severing and feeding mechanism comprising means for moving the sheave forwardly in transverse position, compressing the sheave and severing the same while compressed, means for sluing the severed sheave so that it will enter the separator head first after the severing operation and means whereby the severed butts will be conveyed to a point remote from the machine.

In testimony whereof I have signed my name to this specification in the presence of two subscribing witnesses.

FREDERICK J. SENG.

Witnesses:
W. F. SCHALLHORN,
T. I. BRINKLEY.